April 28, 1959  R. H. STAMM ET AL  2,884,077
ROTOR BLADE HAVING A GAP-BONDED AFT STRUCTURE
AND METHOD OF FABRICATING SAME
Filed Oct. 21, 1953  2 Sheets-Sheet 1

INVENTORS
ROBERT H. STAMM & ALB C. BALLAUER
BY
ATTORNEY

April 28, 1959 R. H. STAMM ET AL 2,884,077
ROTOR BLADE HAVING A GAP-BONDED AFT STRUCTURE
AND METHOD OF FABRICATING SAME
Filed Oct. 21, 1953 2 Sheets-Sheet 2

INVENTORS
ROBERT H. STAMM & ALB C. BALLAUER
BY
ATTORNEY

2,884,077

United States Patent Office
Patented Apr. 28, 1959

2,884,077

ROTOR BLADE HAVING A GAP-BONDED AFT STRUCTURE AND METHOD OF FABRICATING SAME

Robert H. Stamm and Alb C. Ballauer, Traverse City, Mich., assignors to Parsons Corporation, Detroit, Mich., a corporation of Michigan Application October 21, 1953, Serial No. 387,348

17 Claims. (Cl. 170—159)

This invention relates to improvements in rotary wing airfoil structures, and specifically to all-metal rotor blades for helicopters, autogiros and the like.

The principal objects of the present invention are to fabricate an all-metal helicopter rotor blade with a simple rigid primary structure having a previously unattained degree of resistance to fatigue and stress concentrations; to supplement it with a readily fabricated secondary structure likewise free of stress concentrations; and to secure them together into a smoothly streamlined body by adhesive bonding and in a manner adapted to minimize the causes of bonding failure.

Further objects include providing a light weight aft blade structure adapted for attachment to the forward structure without any intermediate chordwise ribs; and to provide uninterrupted spanwise passages in the blade.

A still further object is to join such primary structure to such secondary structure by continuous adhesive-bond joints capable of transmitting bending, shear, torsion and centrifugal tension loads without local concentrations such as tend to cause peeling of adhesive-bond joints.

An additional object is to provide methods and procedures for fabrication of rotor blades in quantity production which assure uniform high quality and reliability.

Figure 1:
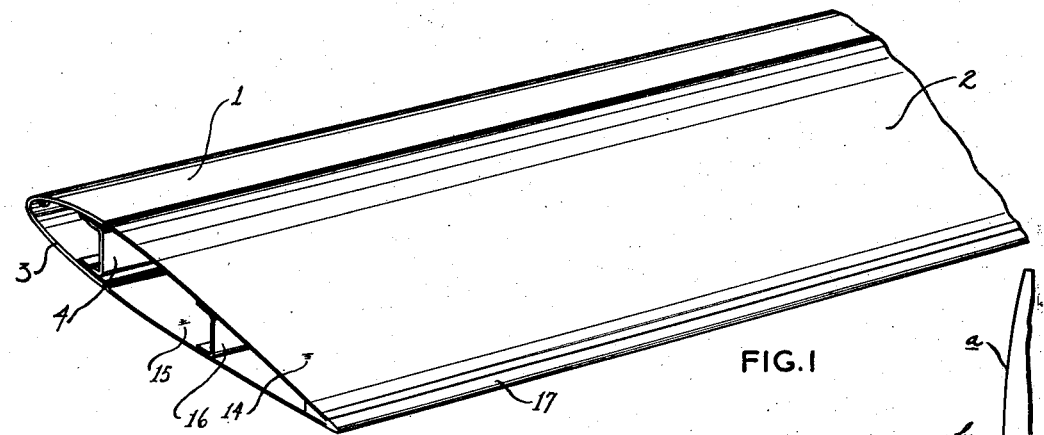
Figure 1 is a perspective view of a rotor blade structure manufactured according to and embodying the present invention, without fittings.

The blade illustrated in Figure 1 consists of two principal units, a primary or leading edge structure 1 and a secondary or aft structure 2. The primary structure 1 comprises a relatively heavy steel trough-like spar 3 formed to the shape of an airfoil leading edge, preferably by progressive rolls. The trough-like spar 3 is preferably formed of a high-strength hard steel in normalized condition.

The trough-like spar 3 is reinforced by a channel 4 which is preferably formed by progressive rolls out of similar steel. It comprises a substantially vertical web portion 5 whose chordwise position substantially coincides with the rear edges 6 of the spar 3. The channel 4 has forwardly extending upper and lower flanges 7, 7' each of which includes an aft flange portion 8, 8' adjacent the web portion 5 and separated therefrom by a radius portion 9, 9'; a forward flange portion 10, 10' and a joggle 11, 11' along a line parallel to the web portion 5. The joggles 11, 11' are preferably formed by rolling along with the rolling of the channel 4, and serve to separate the forward flange portions 10, 10' from each other more widely than the aft forward portions 8, 8'. It will be seen from the drawings that the spacing of the forward flange portions 10, 10' is such as to cause their outer sides to fit against the inner surface of the trough-like spar 3 spacedly forward of the rear edges 6 thereof, leaving the rear margins 12, 12' of the inner surface of the trough 3 facing and spaced from the aft flange portions 8, 8'.

The rear edges 6 of the trough 3 are rounded outward and aft. Since these are disposed substantially opposite the radius portions 9, 9' of the channel 4 they provide for easy entrance to the upper and lower spanwise bonding gaps 13, 13' by which the secondary structure 2 is joined to the primary structure 1, as hereinafter described.

The bonding gaps 13, 13' are of such width as to accommodate the forward margins of the skins of the secondary structure hereinafter referred to. The bonding gaps 13, 13' have aft openings and are otherwise bounded as follows: On the outer side, by the aft extending rear margins 12, 12'; along their forward edges, by the joggles 11, 11'; and along their inner sides, by the aft flange portions 8, 8'.

The forward flange portions 10, 10' are joined to the inner surface of the trough-like spar 3 by continuous spanwise seams $s$, preferably by the silver brazing process. They are so joined before the addition of any further parts thereto, and the brazed seams $s$ are readily inspected by visual and X-ray methods. Any voids in brazing are thus detected before any further work has been performed upon the primary structure 1, and if rejection of the brazed assembly is required at this stage, there will be no great financial loss entailed.

Figure 3:
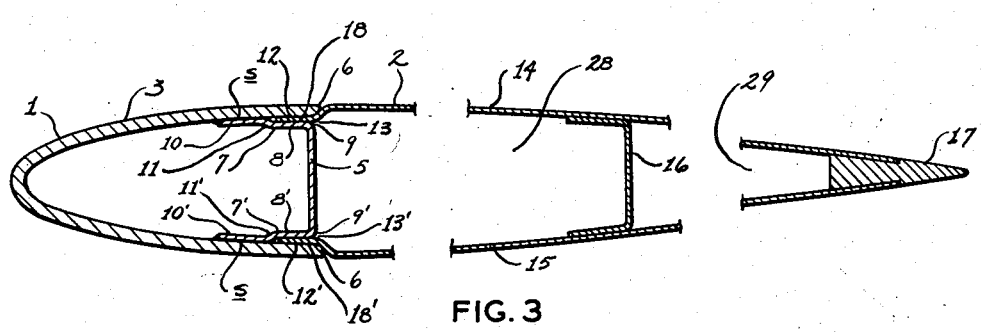
Figure 3 is an enlarged sectional view taken along line 3—3 of Figure 2.

Independently of the fabrication of the primary structure 1, a secondary or aft structure 2 is fabricated. While considerations of balance as well as strength dictate the use of steel in the primary structure 1, the low aerodynamic loads make possible the use of a very light weight secondary structure 2 such as is shown in Figures 1 and 3. It consists of an upper aft skin 14 preferably of aluminum alloy, a lower aft skin 15 of the same metal, an aft aluminum spanwise stiffening channel 16 and an arrowhead shaped trailing edge extrusion 17, assembled together in any approved manner, as by adhesive bonding. The upper aft skin 14 and the lower aft skin 15 have forward margins 18, 18' joggled inwardly an amount equal to the thickness of the steel trough 3 of the primary structure 1. The joggles in the upper aft skin 14 and lower aft skin 15 may be formed by rolling, and the spanwise stiffening channel 16 may be formed in the same way, so that the aft blade structure 2 may be fabricated in a length equal to the entire span of the blade without interruption.

While it is possible to assemble the stiffening channel 16 and the trailing edge extrusion 17 to the aft skins 14, 15 after they have been joined to the primary structure 1, it is considered preferable to fabricate the secondary structure 2 as an independent unit. It thus may be subjected to rigorous inspection; and any defective assemblies are rejected at this stage.

For securement of the secondary structure 2 to the primary structure 1, adhesive bonding tape may be applied to both the outer and inner sides of the forward margins 18, 18' of the upper and lower aft skins 14, 15. The forward margins 18, 18' are then inserted within the bonding gaps 13, 13' of the primary structure 1 and securely bonded in place.

Figure 2:
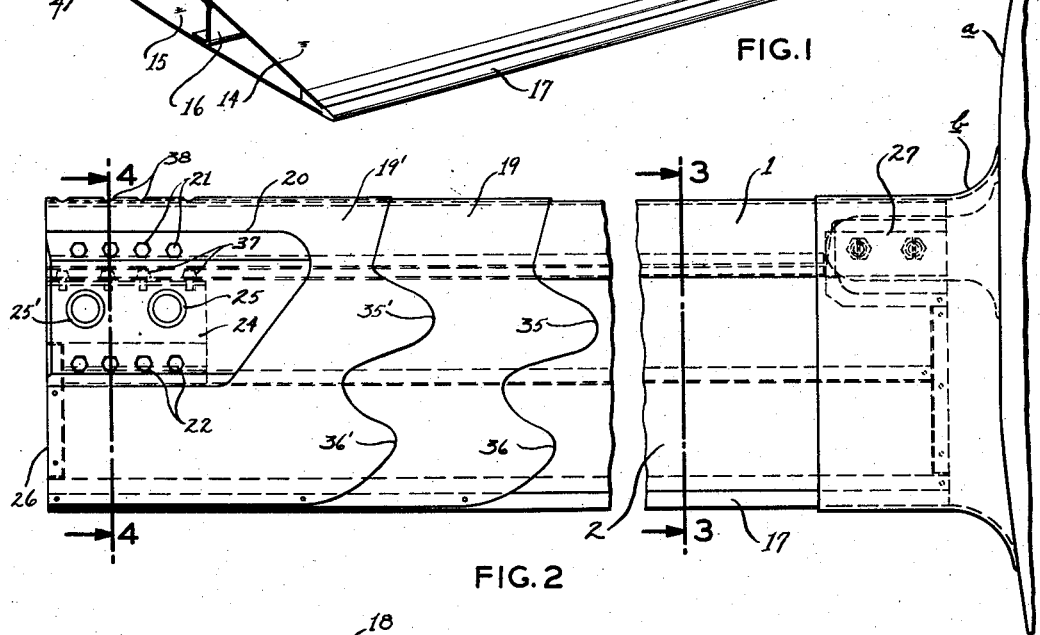
Figure 2 is a plan view of such rotor blade showing typical root and tip attachments.
Figure 4:
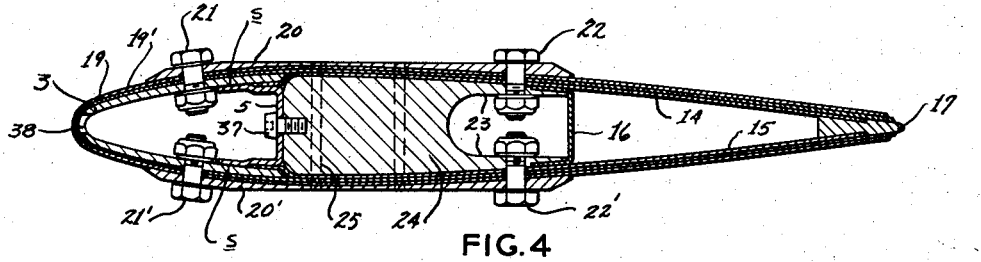
Figure 4 is an enlarged sectional view taken along line 4—4 of Figure 2.

Figure 2 shows at its left end a simple form of root attachment, further illustrated in Figure 4. A pair of wrap-around doublers 19, 19' are shown bonded around the entire periphery of the root end of the blade and riveted to the trailing edge extrusion 17. Each of the doublers 19, 19' includes the forward scalloped fingers 35, 35' extending outboard between the spar rear margins 12, 12' and the spanwise stiffening channel 16 on both the upper and the lower surfaces; and said doublers 19, 19' also include the aft scalloped fingers 36, 36' extending outboard between the spanwise stiffening channel 16 and the trailing edge 17; the spacings of the tips of these scalloped fingers 35, 35', 36, 36' corresponding to the chordwise spacings of these spanwise elements. Inasmuch as the doublers 19, 19' are separately rather flexible, the scalloped fingers 35, 35' 36, 36' deflect when the aft skins 14, 15 wrinkle, as under tension loads; therefore, they are not peeled from the aft skins 14, 15 as would be the case if a rectilinear edge was presented across the direction of wrinkling. In the absence of chordwise ribs, wrinkles propagate in a spanwise direction; and the construction of the doublers 19, 19' is therefore of particular importance in this regard.

Upper and lower reinforcing plates 20, 20' are shown in Figure 4 bonded to the upper and lower surfaces of the outer doubler 19'. They are further secured in place by bolts adjacent the root end of the rotor blade. In Figures 2 and 4 are shown forward upper and lower lines of bolts 21, 21' penetrating the trough 3 forward of the flanges 7, 7', and aft lines of bolts 22, 22' penetrating the upper and lower aft skins 13, 14 forward of the spanwise stiffening channel 16. The aft bolts 22, 22' also penetrate and hold to the aft attachment tips 23 of a filler block 24, which may be formed of relatively light weight structural material and inserted within the secondary structure 2 abutting the aft side of the channel web 5. The filler block 24 is secured along its forward side against and behind the web portion 5 of the steel channel 4, by means of a plurality of internal wrenching bolts 37 along and through the center line of the web portion 5, as shown in Figures 2 and 4. The internal wrenching bolts 37 are inserted through aligned leading edge apertures 38 in the trough-like spar 3.

For mounting to the rotor hub, holes are drilled through the reinforced structure as shown in Figures 2 and 4, that is, through the reinforcing plates 20, 20', doublers 19, 19', the upper and lower aft skins 13, 14 and the filler block 24; and bushings 25, 25' are inserted in place. In this simple fashion the rotor blade structure may be securely attached to a rotor hub (not shown). The portion of the secondary structure aft of the spanwise stiffening channel 16 is closed by riveting a simple root rib 26 at the root end.

The tip end of the blade may be completed in a variety of ways, as by a simple conventional tip structure (not shown). Alternatively many installations are possible to meet the requirements of the particular blade. For instance, if it is desired to attach a ram jet engine, designated $a$ in Figure 2, such engine may be attached by means of a tip fitting 27 bolted within the steel trough 3, the attachment being concealed by a tip fairing, designated $b$. The tubes and wiring necessary to supply fuel to and control such tip engine $a$ may be carried through the unimpeded spanwise passages 28, 29 of the secondary structure, being respectively forward and aft of the spanwise stiffening channel 16. In structures heretofore manufactured, it has been difficult to carry such wiring and tubing through the aft structure because of the use of the chordwise ribs; for which reason the forward structure has frequently been utilized. Good structural practice, however, requires that root and tip end attachments be made to the forward sructure, and these tend to obstruct its ends. Consequently, it is most convenient to have uninterrupted passages 28, 29 available in the aft structure.

The elimination of ribs from the aft structure carries with it the result that any transfer of load from the aft to the forward structure, intermediate such end ribs as may be provided, must take place through the upper and lower skins 14 and 15. Because the air loads on the aft structure are of small magnitude and in no way concentrated, this structural function can be met provided the forward margins 18, 18' are adequately secured. It is apparent that if the primary structure 1 is made to sufficiently close tolerances, the forward margins 18, 18', when bonded in place, will be held securely in double shear and have a fixity approximating that of a clamped edge. This fixity is far in excess of that which can be attained either by riveting or spot welding. Furthermore, the double shear bonded joints accommodate elastically the relative thermal expansion of the aluminum secondary structure 2 with reference to the steel primary structure 1. The difference in expansion between the forward and aft structures is restrained along the bonded joint, not by concentrated forces such as would result if rivets were used, but by well distributed elastic shear strain in the bond material on both sides of the aluminum aft skins 14, 15. The blade structure is thus rendered a composite beam, which may bend slightly chordwise to reach equilibrium.

The channel 4 of the primary structure 1 may be of substantially lighter gauge steel than the trough 3. Inasmuch as the channel web 5 is positioned at the entrance of the bonding gaps 13, 13' it stiffens the bonding gaps so that under loads encountered in service the bonding gaps 13, 13' will not open and cause peeling of the double shear bond to the forward margins 18, 18' of the secondary structure 2.

Figure 5:
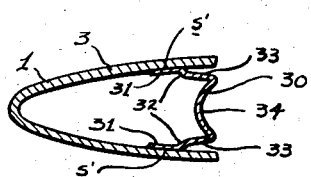
Figure 5 is a schematic drawing illustrating one process for preliminary fabrication of a leading edge structural unit for the rotor blade structure shown.
Figure 6:
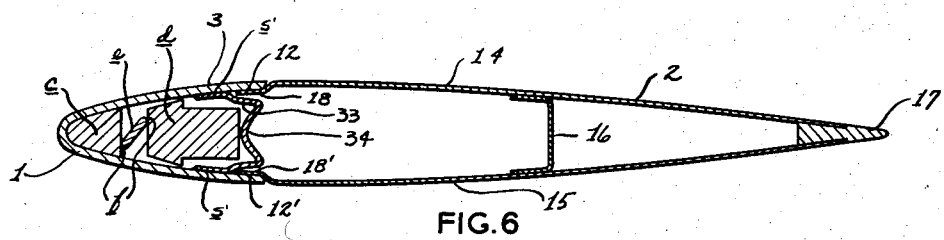
Figures 6 and 7 illustrate successive steps in the completion of the rotor blade structure whose preliminary leading edge unit is illustrated in Figure 5.
Figure 7:
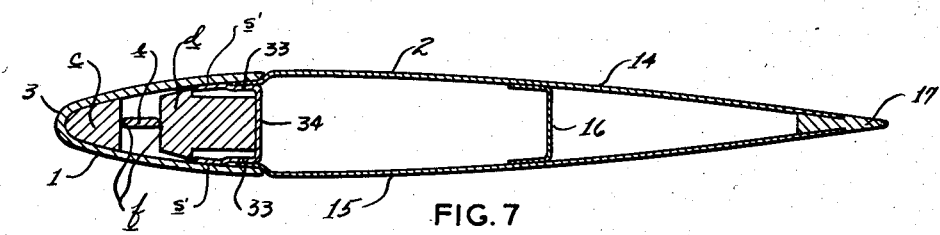

Figures 5, 6 and 7 illustrate an alternate method of forming the primary structure 1 to effect an even more positive clamping of the secondary structure 2. Instead of roll-forming a channel 4, there is shown a bowed channel spanwise reinforcing member 30 having forwardly presented marginal flanges 31 spaced to fit within and against the upper and lower inner surfaces of the trough 3 forward of its rear margins 12, 12'. Inwardly adjacent the marginal flanges 13 and separated therefrom by spanwise joggles 32 are sloping clamp portions 33, intermediate of which is a forwardly bowed web portion 34. The developed length of the web portion 34 is the length of the web portion 5, shown in Figures 1 and 3.

After the spanwise reinforcing member 30 has been rolled to shape, it is inserted within and brazed to the trough 3 by continuous upper and lower spanwise brazed seams $s'$, the members being in the position shown in Figure 5. The brazed joints $s'$ are then inspected, both visually and by X-ray processes. It is apparent that this construction permits easy visual inspection of both forward and aft edges of the brazed joints.

Referring to Figure 6, the aft blade structure 2 is inserted into position within the rear margins 12, 12' of the trough 3, the forward margins 18, 18' being first covered on both sides with adhesive bonding tape. A web-straightening mechanism is inserted within the primary structure 1, such web-straightening mechanism consisting, for example, of an elongated nose pressure block $c$ and floating web shaper block $d$, separated by a twist cam $e$ having rounded edge faces $f$. The position of these elements is shown diagrammatically in Figure 6. The twist cam $e$ is then turned to the position shown in Figure 7 separating the nose pressure block $c$ and the web shaper block $d$ a predetermined amount, thus exerting pressure against the forwardly bowed web portion 34 and substantially straightening it as shown in Figure 7. This straightening process presses the clamp portions 33 outwardly and mechanically clamps the forward margins 18, 18' of the secondary structure 2 within the aft-extending rear margins 12, 12' of the trough 3. The twist cam mechanism may advantageously be retained in place during the subsequent adhesive bonding, especially if the bowed web portion 34 is only partially straightened; the mechanism providing "follow-up" pressure during the bonding operation. However, the elastic characteristics of steel leave a web so straightened with some internal compressive force which of itself maintains continued clamping pressure; hence we find it entirely feasible to remove the straightening mechanism before bonding. The adhesive bonding of the secondary structure to the primary structure thus takes place under high mechanical pressure, assuring tight joints and bringing about the desired degree of edge fixity of the upper aft skin 14 and the lower aft skin 15.

One cause of the failure of adhesive bonded rotor blades heretofore has been peeling of the bonded joints. Such peeling may be started by a variety of causes, including unequal load distribution, deflection under reversed loadings, lack of mechanical edge fixity, and related causes. The use of the bonding gaps 13, 13' of the present structure not only provides for attachment in double shear but also overcomes these causes of bond failure. In addition, the presence of the double shear joint between the web 4 of the primary structure and the heavy steel trough 3 permits the carrying of loads from the secondary structure directly into both of these primary structure elements. This further reduces structural deflections and minimizes the possibility of peeling which results from such structural deflections.

Other advantages of the structure herein shown will be apparent to those familiar with the problems of design of rotor blades and the difficulties encountered with them in service. Furthermore, various adaptations and modifications of the principles herein disclosed will be apparent to those skilled in the art. Accordingly, the present invention should not be construed narrowly but should be considered as fully coextensive with the inventive principles herein disclosed.

We claim:

1. A rotary wing airfoil structure comprising a relatively heavy primary structure having a steel trough-like spar rolled to the shape of an airfoil leading edge, a rolled steel web channel having flanges, and continuous span-wise upper and lower brazed joints whereby the web channel flanges are brazed to and within the inner surface of the spar, the said airfoil structure further comprising a relatively light secondary structure including upper and lower aft skins and a trailing edge joint for said skins, the secondary structure being secured to that portion of the primary structure adjacent and chordwise aft of said brazed joints by continuous span-wise adhesive bonds along the forward margins of the upper and lower aft skins.

2. A rotary wing airfoil structure comprising a forward primary structure including a steel trough-like spar having the shape of an airfoil leading edge and having aft-extending rear margins, a steel web channel having flanges, continuous span-wise upper and lower brazed joints by which the channel flanges are brazed to and within the inner surface of the spar forward of the rear margins thereof, and a narrow aft-opening span-wise bonding gap along and within each rear margin of the spar and aft of the brazed joints, the said airfoil structure further comprising an aft secondary structure including upper and lower aft skins and a trailing edge joint for said skins, the said primary and secondary structures being joined by double shear adhesive bonds whereby the forward margins of the upper and lower skins are secured within the bonding gaps.

3. A rotary wing airfoil structure as defined in claim 2, the edge fixity of the forward margins of the upper and lower skins within the bonding gaps being that of a continuously clamped sheet.

4. A rotary wing airfoil structure comprising a forward primary structure including a steel trough-like spar having the shape of an airfoil leading edge and aft-extending rear margins, a steel web channel having flanges, each flange having a forward flange portion and an aft flange portion, continuous span-wise upper and lower brazed joints by which the forward flange portions are brazed to and within the inner surface of the spar forward of the rear margins thereof, and a narrow aft-opening span-wise bonding gap along and within each rear margin of the spar aft of the brazed joints, the aft portion of each flange forming the inner side of the bonding gap adjacent thereto, the said airfoil structure further comprising an aft secondary structure including upper and lower aft skins and a trailing edge joint for said skins, the said primary and secondary structures being joined by double shear adhesive bonds whereby the forward margins of the upper and lower skins are secured within the bonding gaps.

5. A rotary wing airfoil structure as defined in claim 4, the aft flange portions being spaced parallel to and inward of the rear margins of the spar.

6. A rotary wing airfoil structure as defined in claim 4, each flange of the channel having a joggle separating its aft flange portion from its forward flange portion, the said joggle spacing the forward flange portions a greater distance from each other than the distance separating the rear flange portions, the said joggles forming the forward ends of the bonding gaps.

7. A rotary wing airfoil structure as defined in claim 4, the web of said channel being on the aft side of the flanges thereof and serving as a rigid separator for said flanges, whereby the inner sides of said bonding gaps are stiffened.

8. A rotary wing airfoil structure as defined in claim 4, the web of said channel being on the aft side of the flanges thereof and serving as a rigid separator for said flanges, there being radii at the juncture of the web with each flange, the chord-wise location of the web corresponding substantially with the rear margins of the spar, the said rear margins being rounded outwardly and aft, whereby insertion of the forward margins of the upper and lower skins of the secondary structure is facilitated.

9. A rotary wing airfoil structure as defined in claim 4, the secondary structure being fabricated of material having a coefficient of thermal expansion substantially different from that of the primary structure, the double shear adhesive bonds within the bonding gaps resisting in distributed elastic strain relative expansion and contraction as between the primary and secondary structures, so as to reach equilibrium in chordwise bending without local concentrations of load.

10. A rotary wing airfoil structure as defined in claim 4, together with secondary structure internal stiffening elements arranged spanwise and providing an unimpeded spanwise passage aft of the primary structure.

11. A rotary wing airfoil structure comprising a forward primary structure including a trough-like metal spar having aft extending rear margins, a metal web channel having flanges, continuous span-wise upper and lower high strength metallic joints by which the channel flanges are joined to and within the inner surface of the spar forward of the rear margins thereof, transforming the spar and web channel into a substantially integral, readily inspected tubular structure, and a narrow aft-opening spanwise gap along each rear margin of the spar aft of the metallic joints, the said airfoil structure further comprising an aft secondary structure including upper and lower aft skins of nearly the same thickness as the width of the spanwise gaps, and a trailing edge joint for said skins, the said primary and secondary structures being joined by securing the forward margins of the upper and lower skins in double shear within the spanwise gaps.

12. A process of making a rotary wing airfoil structure, comprising the steps of fabricating a leading edge trough, separately fabricating a spanwise reinforcing member therefor, said reinforcing member having forwardly-presented marginal flanges spaced to fit within and against the upper and lower inner surfaces of the trough, forward of the rear margins thereof, further having sloping clamp portions adjacent and aft of the flanges, and a forwardly-bowed intermediate web portion, then joining the flanges of the reinforcing member to the upper and lower inner surfaces of the trough in spanwise seams, separately fabricating an aft blade structure having upper and lower skins, the forward margins thereof being unsupported, positioning the aft blade structure in place relative to the leading edge trough with the forward margins of the skins of the aft blade structure between the rear margins of the trough and the clamp portions of the reinforcing member, and substantially straightening the forwardly-bowed web portion and thereby forcing the clamp portions outward to effect clamping of the forward margins of the skins of the aft blade structure between the said clamp portions of the reinforcing member and the rear margins of the leading edge trough.

13. A process of making a rotary wing airfoil structure, comprising the steps of fabricating a leading edge trough, separately fabricating a spanwise reinforcing member therefor, said reinforcing member having forwardly-presented marginal flanges spaced to fit within and against the upper and lower inner surfaces of the trough, forward of the rear margins thereof, further having sloping clamp portions adjacent and aft of the flanges, and a forwardly-bowed intermediate web portion, then joining the flanges of the reinforcing member to the upper and lower inner surfaces of the trough in spanwise seams, separately fabricating an aft blade structure having upper and lower skins, the forward margins thereof being unsupported, applying adhesive for bonding the forward margins of the aft blade structure between the rear margins of the trough and the clamp portions of the reinforcing member, positioning the aft blade structure in place relative to the leading edge trough with the forward margins of the skins of the aft blade structure between the rear margins of the trough and the clamp portions of the reinforcing member, substantially straightening the forwardly-bowed web portion and thereby forcing the clamp portions outward to effect clamping of the forward margins of the skins of the aft blade structure between the said clamp portions of the reinforcing member and the rear margins of the leading edge trough, and completing the bonding of the portions so clamped.

14. A process of making a rotary wing airfoil structure, comprising the steps of fabricating a leading edge, separately fabricating a spanwise reinforcing member therefor, said reinforcing member having marginal flanges spaced to fit within and against the upper and lower inner surfaces of the leading edge forward of the rear margins thereof, further having clamp portions adjacent the flanges, and a bowed intermediate web portion, then joining the flanges of the reinforcing member to the upper and lower inner surfaces of the leading edge in spanwise seams, separately fabricating an aft blade structure having upper and lower skins, the forward margins thereof being unsupported, applying adhesive for bonding the forward margins of the skins of the aft blade structure between the rear margins of the leading edge and the clamp portions of the reinforcing member, positioning the aft blade structure in place relative to the leading edge with the forward margins of the skins of the aft blade structure between the rear margins of the leading edge and the clamp portions of the reinforcing member, then substantially straightening the bowed web portion and forcing the clamp portions outward to effect clamping of the forward margins of the skins of the aft blade structure between the said clamp portions of the reinforcing member and the rear margins of the leading edge, and completing the bonding of the portions so clamped.

15. The process of securing airfoil skin portions spanwise along a spar, comprising the steps of fabricating a spar having upper and lower surfaces with aft margins and having a bent web joined thereto forward of said aft margins, the extended depth of the web being substantially greater than the depth between said surfaces, then inserting a skin portion inwardly adjacent one of said spar surfaces aft of the web joint thereto, then bending the web to position a portion thereof inwardly adjacent and clampingly against the inner side of the skin portion, and then joining the skin portion in double shear between the spar surface and the clamping portion of the web.

16. The process defined in claim 15, with the intermediate step of applying adhesive bond material to both sides of the skin before positioning it inwardly adjacent the spar surface, the final step of joining being by adhesive bonding.

17. A helicopter rotor blade comprising a spanwise spar and aft structure adhesively joined thereto, the aft structure having a skin together with spanwise internal stiffening elements spaced chordwise from each other and having spanwise adhesive junctures with the inner surface of the skin, the blade further comprising a root end sheet metal doubler adhesively joined to the outer surface of the aft structure skin and having a spanwise-outer edge including a plurality of spanwise-projecting finger-like portions overlaying said outer skin surface and interposed successively between the spanwise adhesive junctures of said internal stiffening elements with the skin.

References Cited in the file of this patent

UNITED STATES PATENTS

| | | |
|---|---|---|
| 1,457,844 | Leitner | June 5, 1923 |
| 2,393,081 | Watter | Jan. 15, 1946 |
| 2,450,455 | Synder | Oct. 5, 1948 |
| 2,460,351 | Hoffman | Feb. 1, 1949 |
| 2,470,128 | Barrick | May 17, 1949 |
| 2,511,858 | Lampton | June 20, 1950 |
| 2,574,980 | Meyers | Nov. 13, 1951 |
| 2,589,193 | Mayne | Mar. 11, 1952 |
| 2,694,458 | Stevens | Nov. 16, 1954 |